(12) United States Patent
Schaefer et al.

(10) Patent No.: US 11,540,435 B2
(45) Date of Patent: Jan. 3, 2023

(54) SPLIT GAUGE WHEEL SCRAPER

(71) Applicant: Precision Planting LLC, Tremont, IL (US)

(72) Inventors: Timothy Schaefer, Tremont, IL (US); Douglas Urbaniak, Tremont, IL (US)

(73) Assignee: Precision Planting, LLC, Tremont, IL (US)

( * ) Notice: Subject to any disclaimer, the term of this patent is extended or adjusted under 35 U.S.C. 154(b) by 434 days.

(21) Appl. No.: 16/805,344

(22) Filed: Feb. 28, 2020

(65) Prior Publication Data

US 2020/0281109 A1 Sep. 10, 2020

Related U.S. Application Data

(60) Provisional application No. 62/814,841, filed on Mar. 6, 2019.

(51) Int. Cl.
*A01B 71/08* (2006.01)
*A01C 7/20* (2006.01)
*A01B 63/16* (2006.01)
*A01C 5/00* (2006.01)

(52) U.S. Cl.
CPC .............. *A01B 71/08* (2013.01); *A01B 63/16* (2013.01); *A01C 5/00* (2013.01); *A01C 7/203* (2013.01)

(58) Field of Classification Search
CPC ......... A01B 71/08; A01B 63/16; A01B 71/00; A01B 63/14; A01B 63/00; A01C 5/00; A01C 7/203; A01C 7/201; A01C 7/20; A01C 7/00
See application file for complete search history.

(56) References Cited

U.S. PATENT DOCUMENTS

| | | | |
|---|---|---|---|
| 5,269,380 | A | 12/1993 | Lofquist et al. |
| 5,884,711 | A | 3/1999 | Shoup |
| 7,730,962 | B1 | 6/2010 | Kester |
| 8,960,322 | B2 | 2/2015 | Kester |
| 9,113,587 | B2 | 8/2015 | Hesla |
| 2018/0103570 | A1 | 4/2018 | Sorensen |
| 2019/0230844 | A1* | 8/2019 | Sorensen ............... A01C 5/068 |

* cited by examiner

*Primary Examiner* — Christopher J. Novosad

(57) ABSTRACT

A scraper assembly for a split gauge wheel of a planter row unit. The scraper assembly includes a scraper blade having a finger projection configured to extend downwardly into a gap between the inner and outer wheel members of the split gauge wheel. An inner scraper flange extends laterally inward from the finger projection and is disposed in proximity to a circumferential periphery of the inner wheel member. An outer scraper flange extends laterally outward from the finger projection and is disposed in proximity to a circumferential periphery of the outer wheel member. As the gauge wheel rotates, the inner and outer scraper flanges remove soil buildup on the circumferential periphery of the respective inner and outer wheel members and the finger projection removes soil buildup in the gap between the inner and outer wheel members.

25 Claims, 17 Drawing Sheets

//H1 SPLIT GAUGE WHEEL SCRAPER

BACKGROUND

Scrapers for scraping soil buildup and debris from gauge wheels are well known, including as disclosed in U.S. Pat. Nos. 5,269,380; 5,884,711; 7,730,962; 8,960,322, 9,113,587 and in U.S. Patent Publication No. US2018/0103570. However, such gauge wheel scrapers are configured for use with conventional gauge wheels. If such scrapers were used with split gauge wheels, such as the type used with Precision Planting's Conceal™ system, the soil buildup and debris scraped from the wheels would fall into the space between the split gauge wheels and potentially into the open furrow or the falling soil buildup and debris may accumulate in the space between the split gauge wheels adversely affecting performance.

DESCRIPTION

Figure 1:
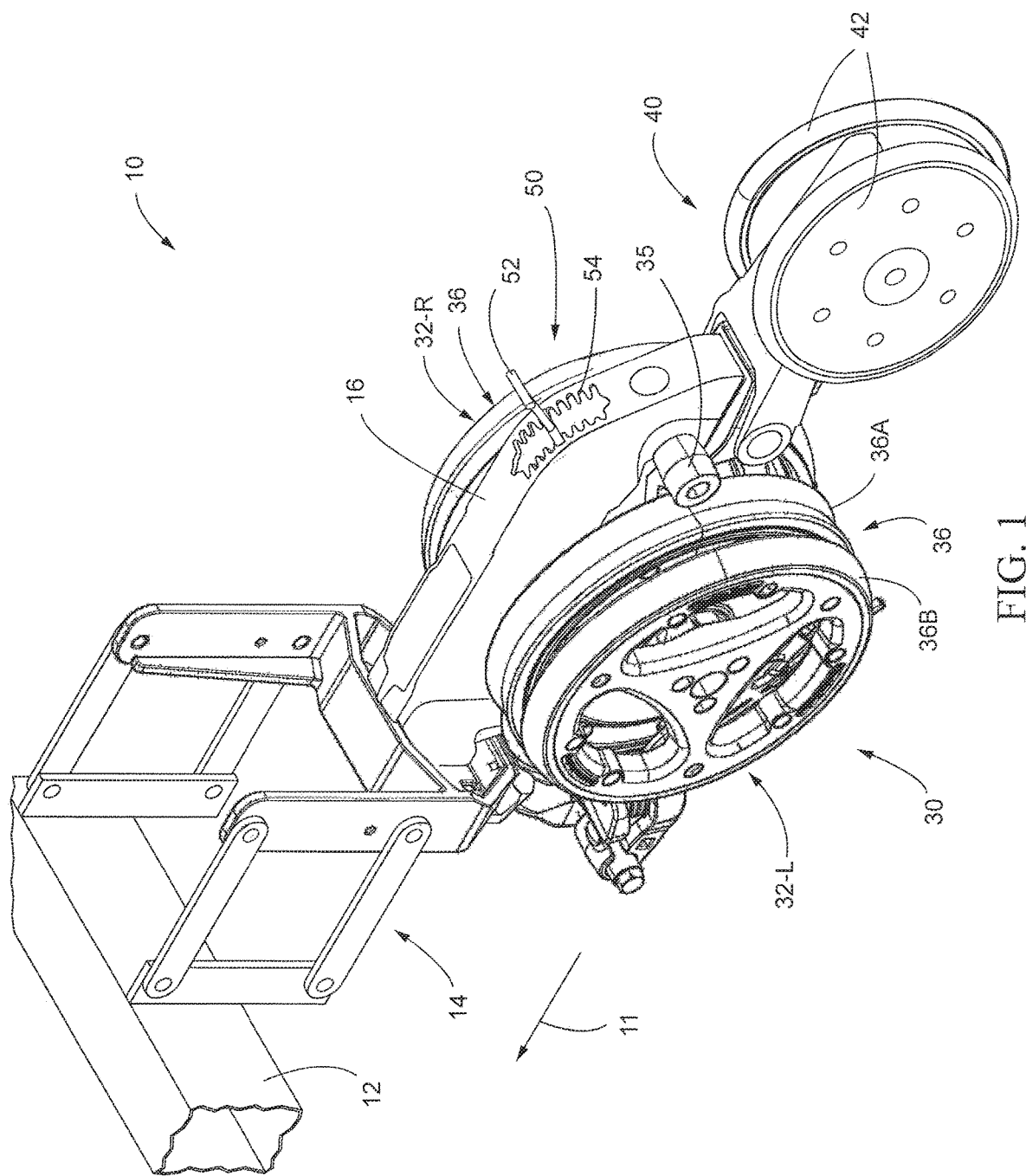
FIG. 1 is a rear perspective view of a planter row unit utilizing split-gauge wheels.

Referring now to the drawings wherein like reference numerals designate the same or corresponding parts throughout the several views, FIG. 1 shows a rear perspective view of a planter row unit 10 of an agricultural planter. It should be appreciated that although only one row unit 10 is shown, the planter will include a plurality of row units 10 spaced along the toolbar 12 each supported from the toolbar 12 by a parallel linkage 14 which permits each row unit 10 to move vertically independently of the toolbar 12 and the other row units 10. The row unit 10 includes a row unit frame 16. The row unit frame 16 supports a furrow opening assembly 30 and a furrow closing assembly 40. Although not shown, the row unit frame 16 will also support a seed meter, a seed tube or seed conveyor and minihopper (for a central fill planter) or one or more larger hoppers for a conventional planter row unit would be recognized and understood by those of skill in the art.

The furrow opening assembly 30 comprises a left gauge wheel assembly 32-L and right gauge wheel assembly 32-R. Throughout this description the left and right gauge wheel assemblies are interchangeably referenced as simply the gauge wheel assembly 32 unless specific reference is being made to either the left or right gauge wheel assembly, in which case the left designator "L" or right designator "R" will be used.

Figure 7:
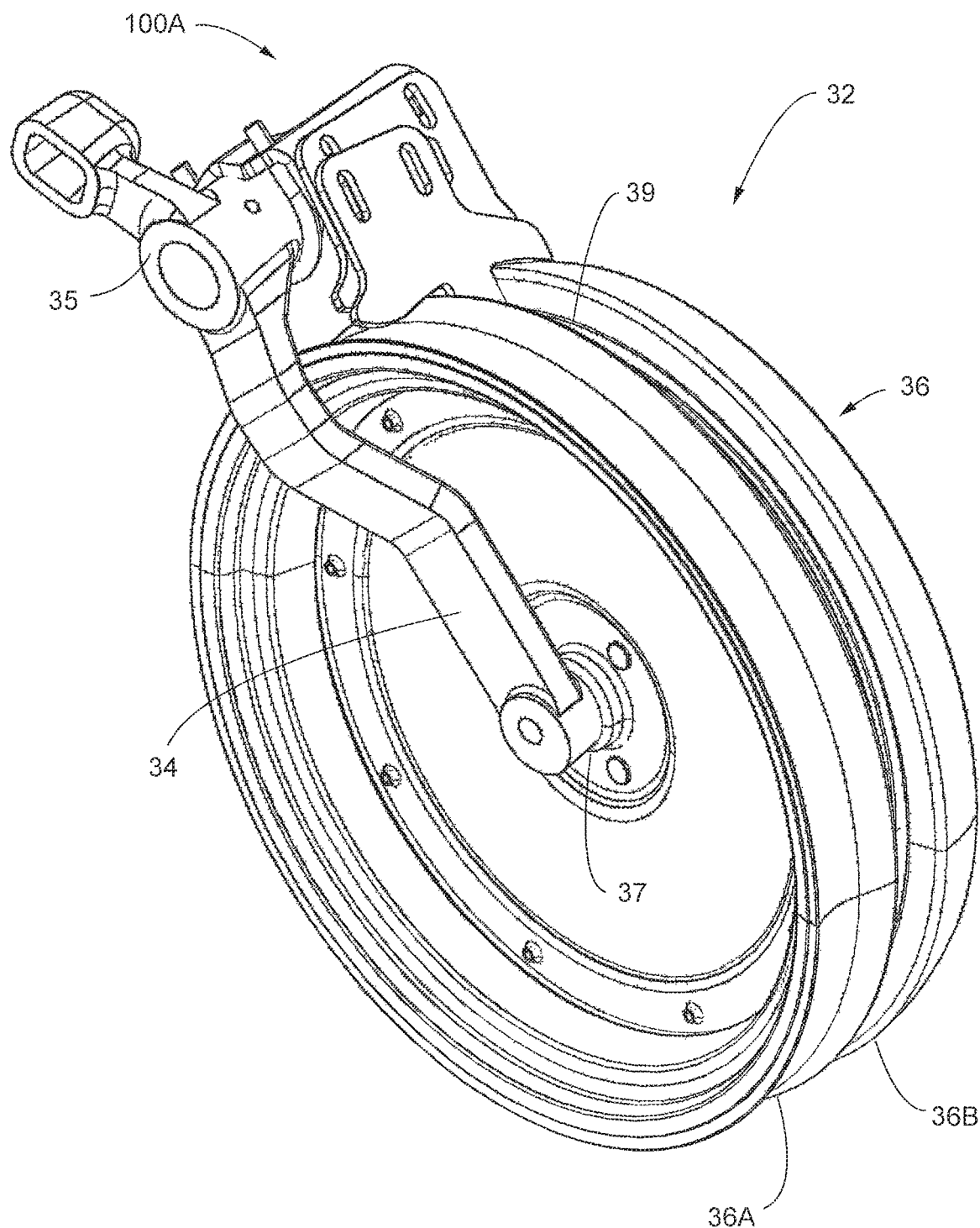
FIG. 7 is a perspective view of the split gauge wheel assembly and scraper assembly of FIG. 6 viewed from the inner side of the gauge wheel assembly showing the gauge wheel arm.
Figure 8:
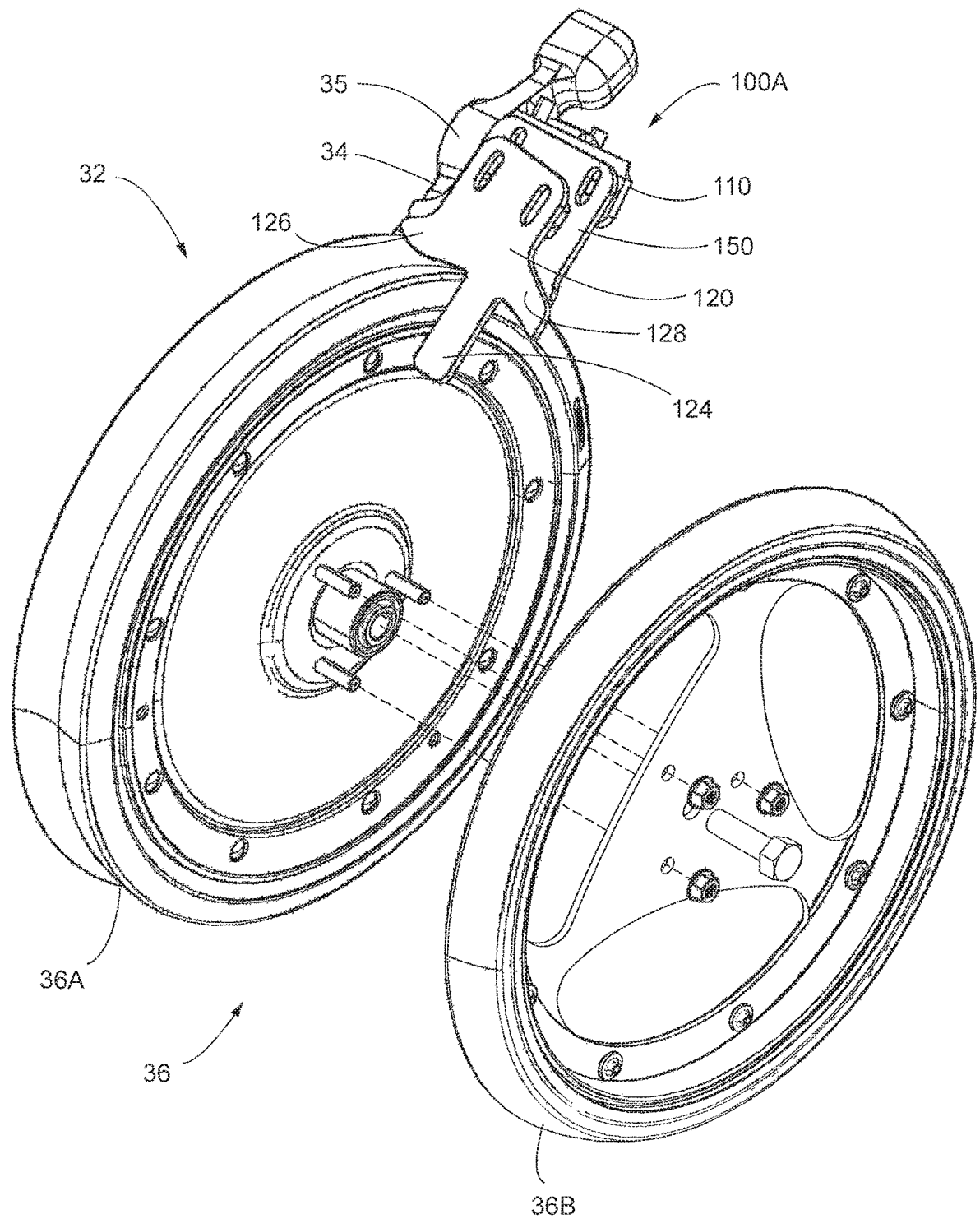
FIG. 8 the same perspective view as FIG. 6 with the split gauge wheel assembly shown exploded.
Figure 9:
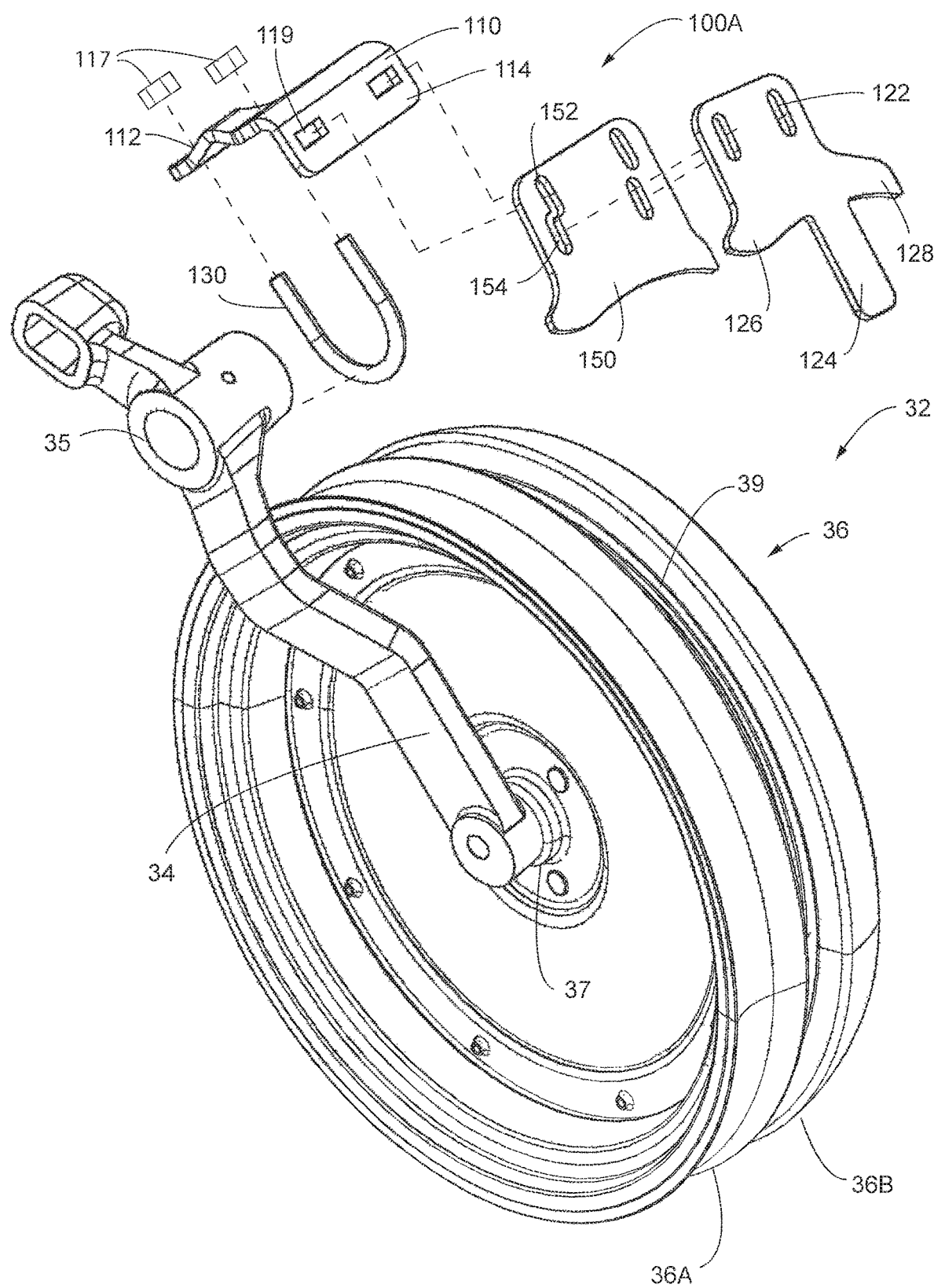
FIG. 9 is the same perspective view as FIG. 7 with the scraper assembly shown exploded.
Figure 10:
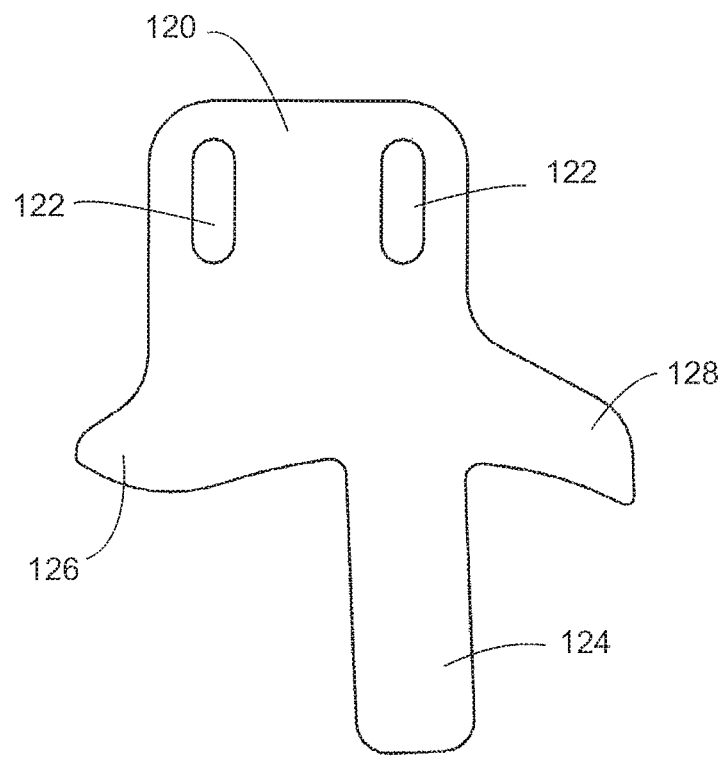
FIG. 10 is a plan view of an embodiment of the scraper blade of the scraper assembly shown in FIGS. 2-9.
Figure 11:
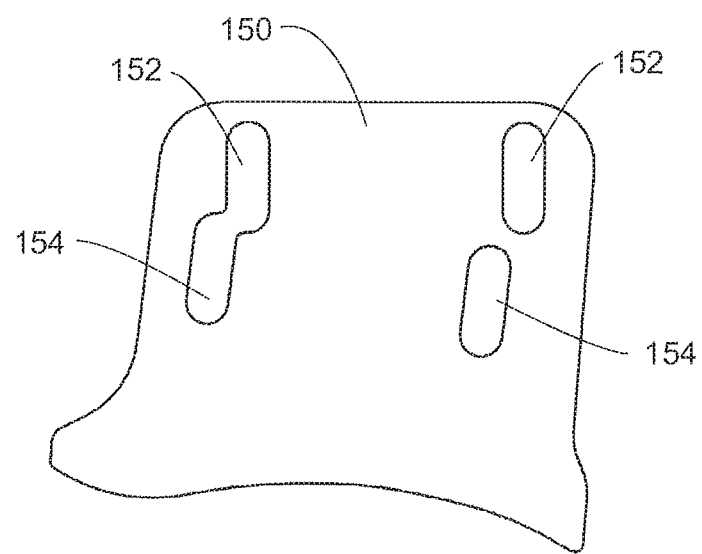
FIG. 11 is a plan view of an embodiment of an intermediate plate of the scraper assembly embodiment of FIGS. 6-9.

Each gauge wheel assembly 32 includes a gauge wheel arm 34 (best viewed in FIGS. 3, 7, 14) which is pivotally supported at one end from the row unit frame 16 at the arm hub 35. The other end of the gauge wheel arm 34 extends forwardly from the arm hub 35 and rotatably supports the gauge wheel 36 at a wheel hub 37 (see FIGS. 3, 7 and 14). Those of skill in the art will recognize and understand that on some planters, the gauge wheel arm 34 is oriented in the opposite direction, i.e., with the arm hub 35 mounted to a forward shank of the row unit frame 16 and the gauge wheel arm 34 extending rearwardly to support the gauge wheel 36. It should be appreciated that the scraper assemblies 100, 100A (described later) are suitable for planters with such oppositely oriented gauge wheel assemblies. As is conventional and readily understood by those of skill in the art, although not shown in FIG. 1, the furrow opening assembly 30 further includes a pair of furrow opening discs disposed between the left and right gauge wheel assemblies 32. The furrow opening discs cut a furrow in the soil as the row unit proceeds in the forward direction of travel as indicated by arrow 11. The seed tube or seed conveyor (not shown) extends downwardly from the seed meter and between the furrow opening discs. The seed tube directs the seed discharged by the seed meter into the open seed furrow before the open furrow is closed by the furrow closing assembly 40. The furrow closing assembly includes a pair of closing wheels 42, each disposed on opposite sides of the furrow formed by the opening discs. The closing wheels 42 are oriented to close the furrow by pushing the soil into the open seed furrow covering the previously deposited seed.

As is also well known in the art, a depth adjustment assembly 50 is provided for setting the depth of the furrow to be cut by the opening discs. The depth adjustment assembly 50 includes a handle 52 that engages with channels 54 in the row unit frame 16 for selectively positioning a stop member or rocker that engages with the gauge wheel arms 34 to limit the amount of vertical travel of the gauge wheel arms 34 relative to the furrow opening discs, thus setting the depth at which the furrow opening discs are able to penetrate into the soil below the gauge wheels.

Figure 2:
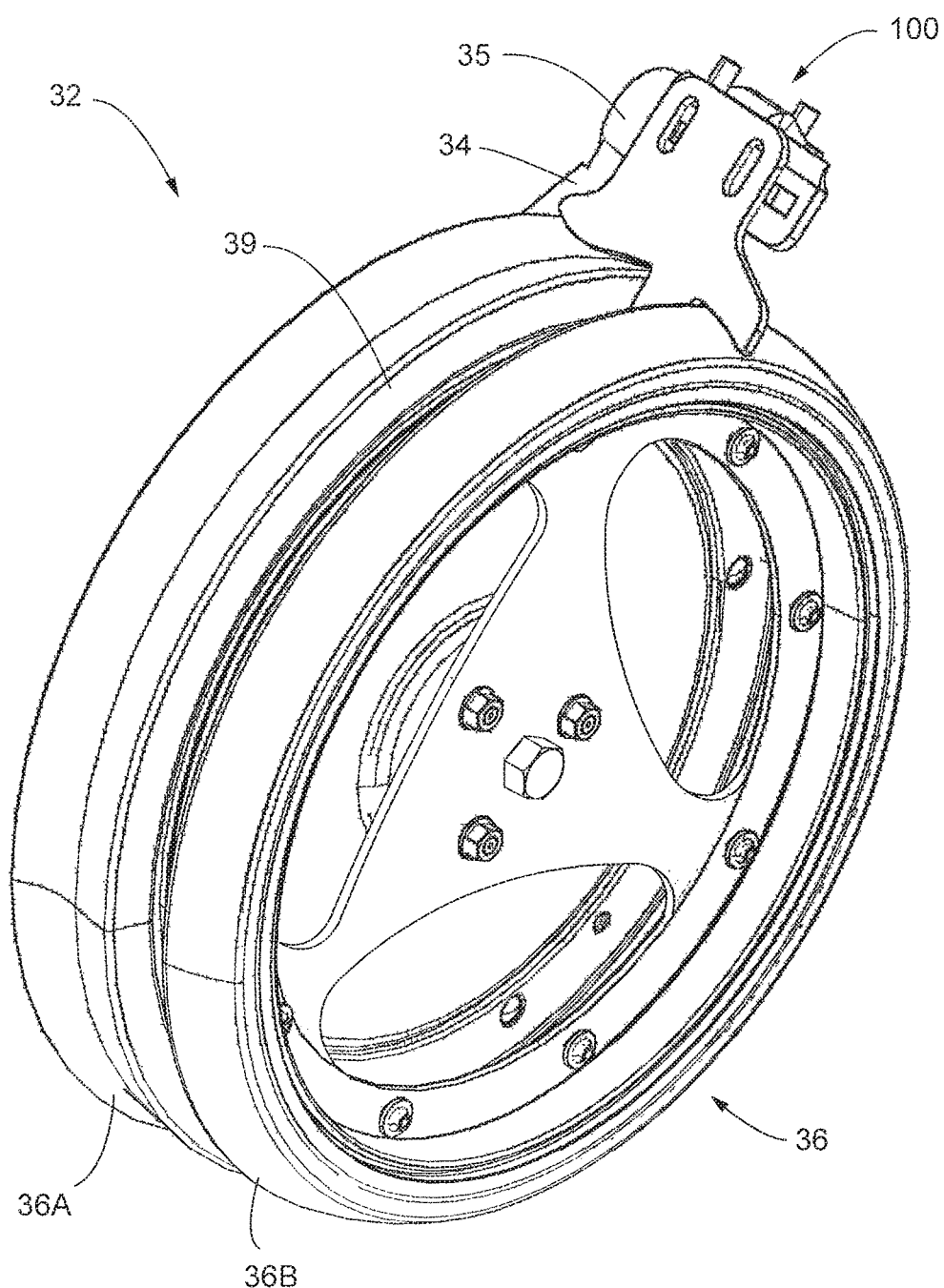
FIG. 2 is a front perspective view of the split gauge wheel assembly shown in FIG. 1 with one embodiment of a scraper assembly.
Figure 3:
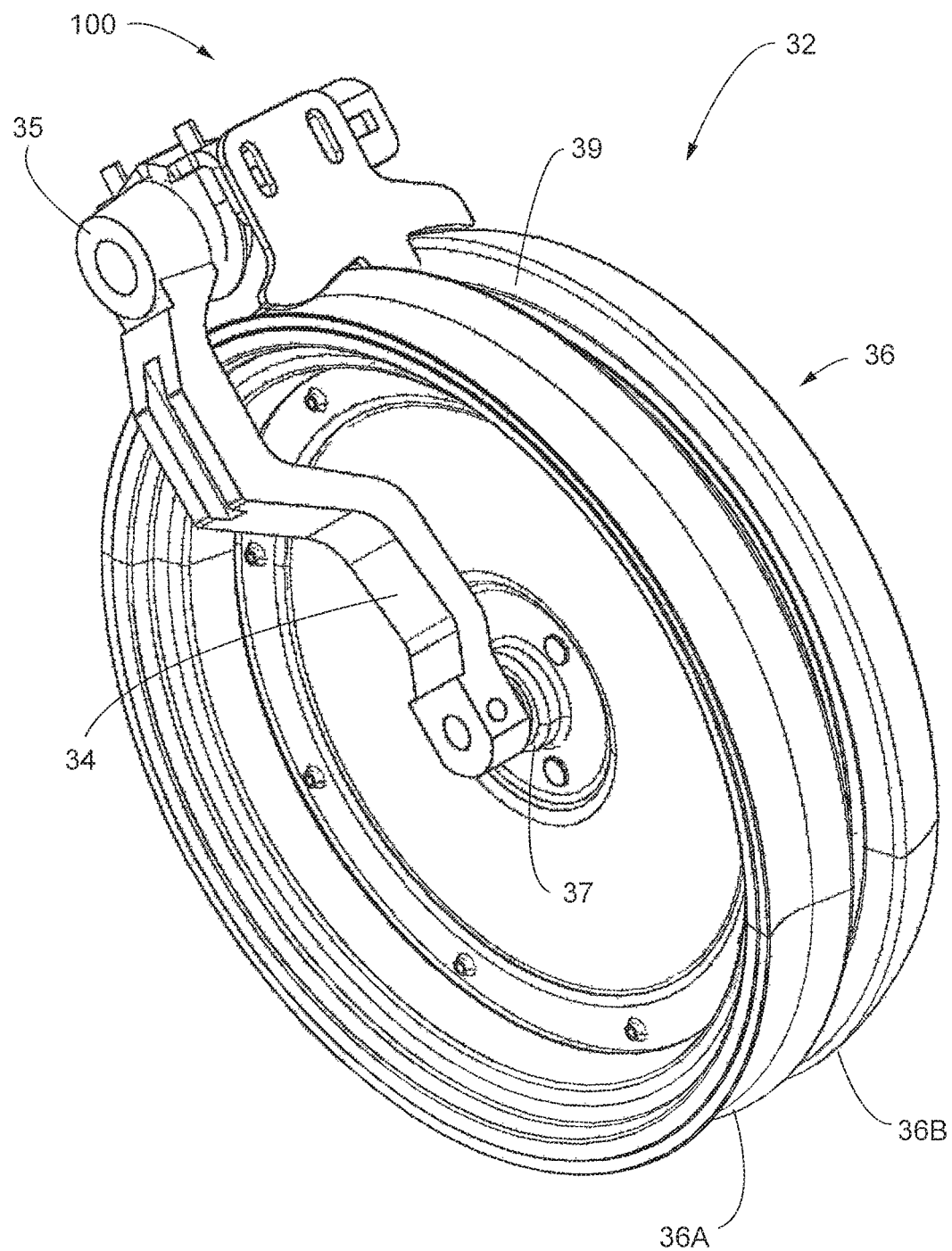
FIG. 3 is a perspective view of the split gauge wheel assembly and scraper assembly of FIG. 2 viewed from the inner side of the gauge wheel assembly showing the gauge wheel arm.

FIGS. 2-5 show a gauge wheel assembly 32 removed from the row unit frame 16 for clarity. FIG. 2 is a forward perspective view of the gauge wheel assembly 32 shown in FIG. 1. FIG. 3 shows the gauge wheel assembly of FIG. 2 rotated 180 degrees to show the gauge wheel arm 34 on the inside of the gauge wheel assembly 32. The gauge wheel assembly 32 includes a split gauge wheel 36 comprising an inner wheel member 36A and an outer wheel member 36B, which are spaced apart laterally resulting in a gap or space 39 between the inner and outer wheels 36A, 36B.

Figure 4:
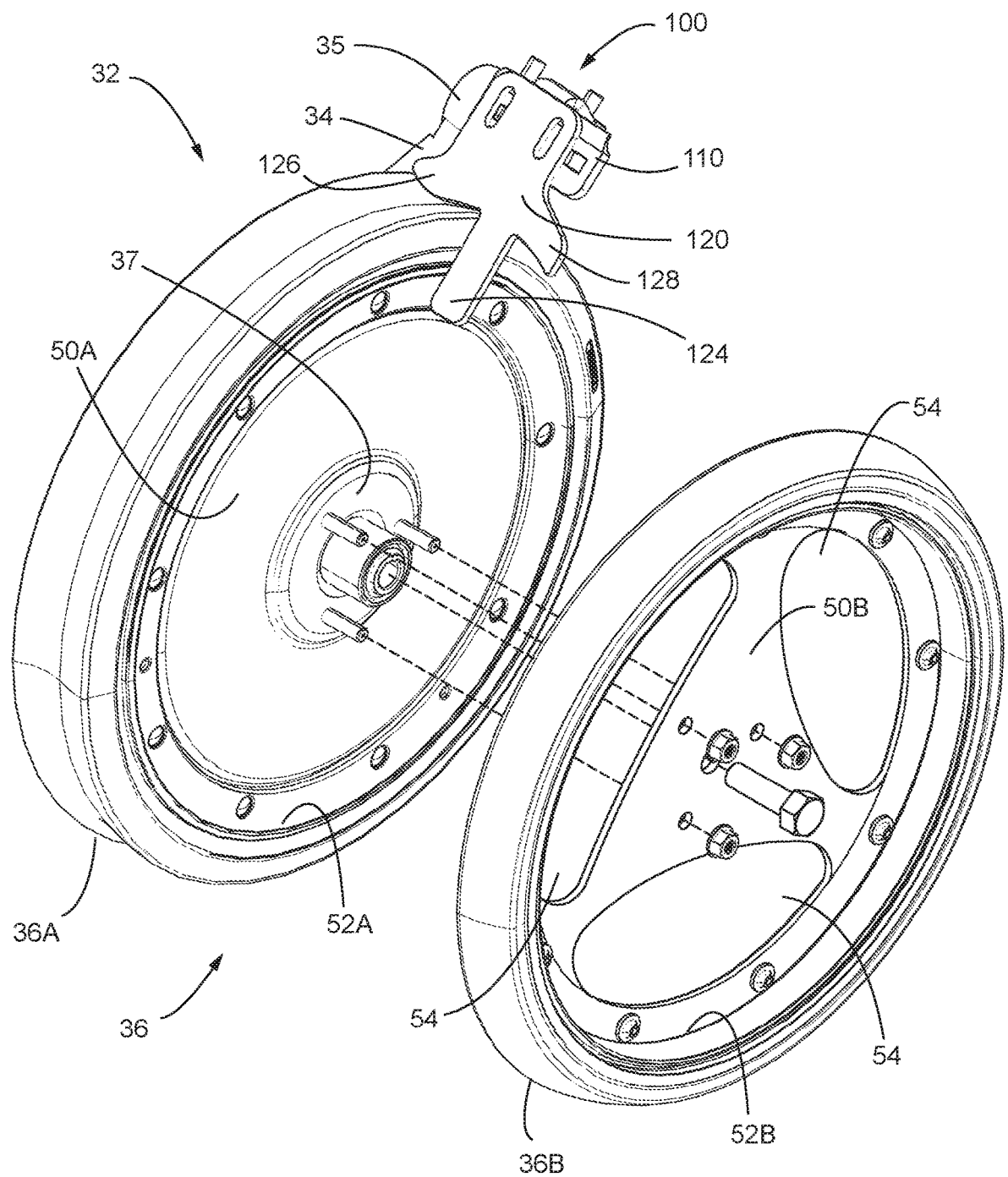
FIG. 4 the same perspective view as FIG. 2 with the split gauge wheel assembly shown exploded.

As best illustrated in FIG. 4, in which the outer wheel member 36B is shown in an exploded view from the inner wheel member 36A, a scraper assembly 100 is positioned with respect to the inner and outer wheel members 36A, 36B to scrape soil buildup, mud, debris, plant matter or rocks from their outer surface and from between the inner and outer wheel members 36A, 36B as they rotate.

In one embodiment, the inner wheel member 36A has a solid wheel disc 50A extending between the wheel hub 37 and its wheel rim 52A, whereas the outer wheel member 36B has a spoked wheel disc 50B defining openings 54 between the wheel hub 37 and its wheel rim 52B. It should be appreciated that the solid wheel disc 50A on the inner wheel member 36A prevents mud and debris from passing into and building up in the area between the inner wheel 36A and the furrow opening discs (not shown), which may otherwise occur if the inner wheel disc 50A was spoked similar to the outer wheel disc 50B. Likewise, it should be appreciated that any mud or debris that falls between the inner and outer wheel members 36A, 36B after being removed by the scraper assembly 100 will pass through the openings 54 in the outer wheel member 36B as the gauge wheel members 36A, 36B rotate.

Figure 5:
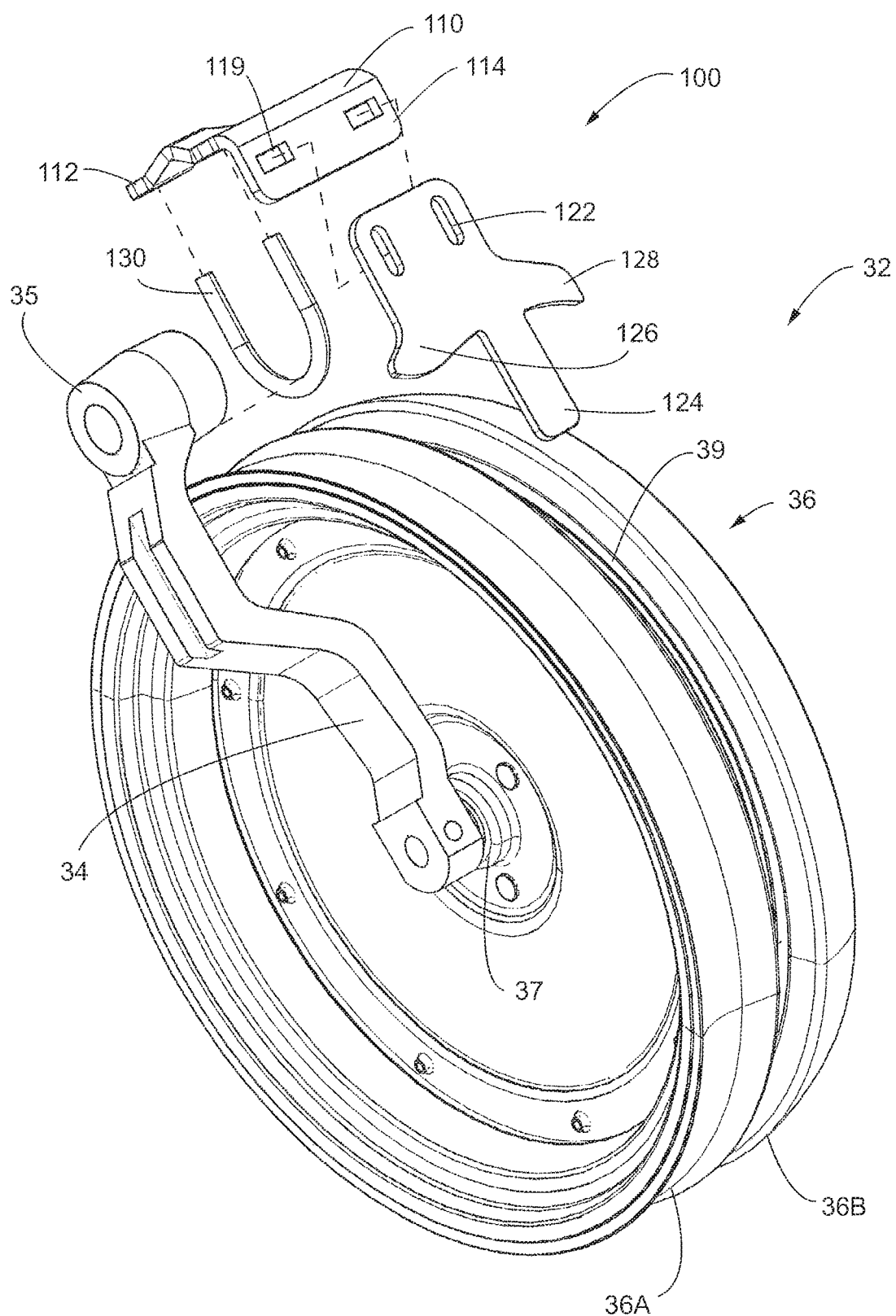
FIG. 5 is the same perspective view as FIG. 3 with the scraper assembly shown exploded.
Figure 6:
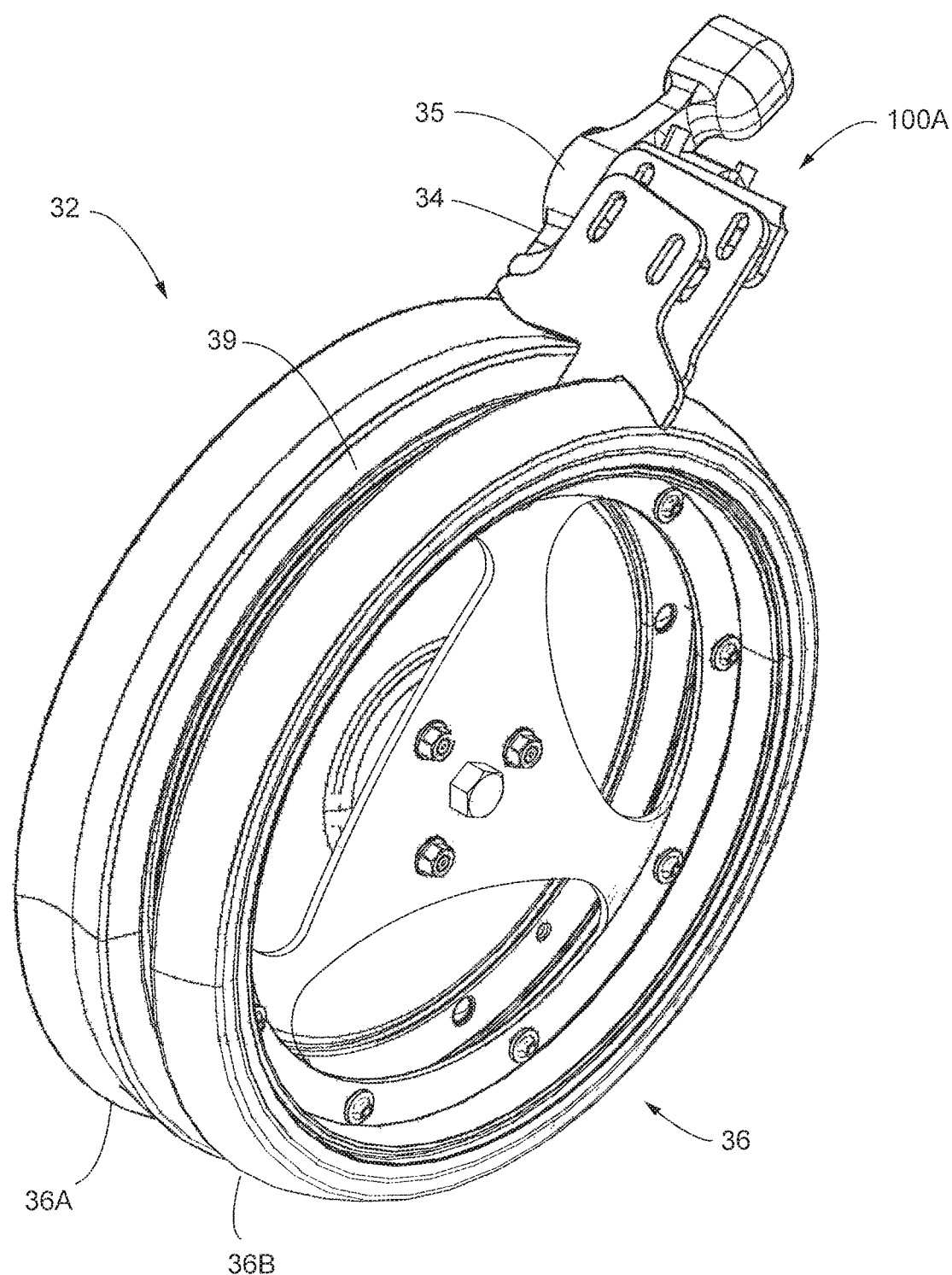
FIG. 6 is a front perspective view of the split gauge wheel assembly shown in FIG. 1 with another embodiment of a scraper assembly.
Figure 12:
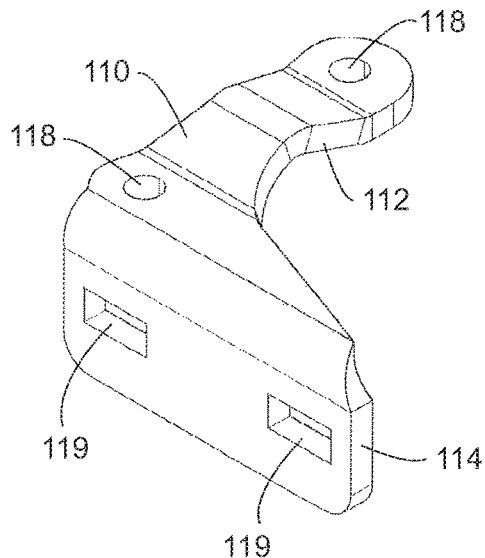
FIG. 12 is a perspective view of an embodiment of a scraper bracket.
Figure 12A:
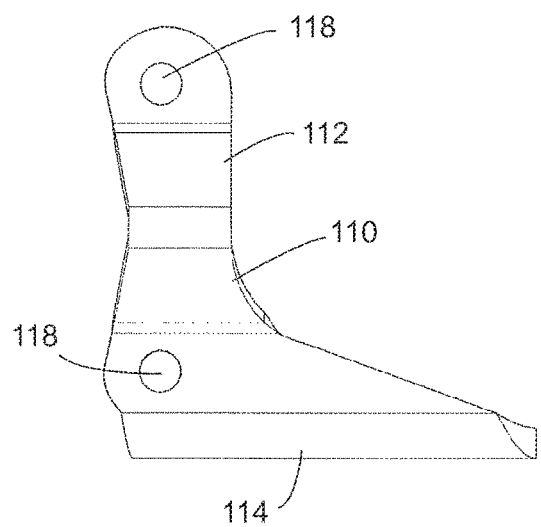
FIG. 12A is a top plan view of the scraper bracket of FIG. 12.
Figure 12C:
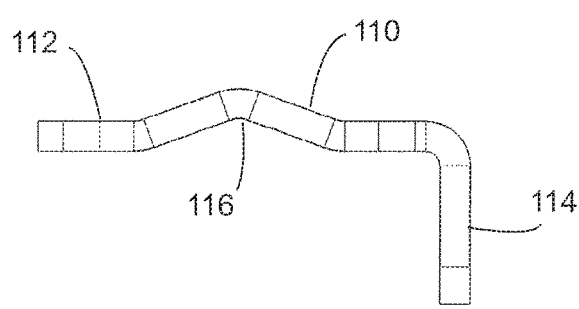
FIG. 12C is a left side elevation view of the scraper bracket of FIG. 12.
Figure 12D:
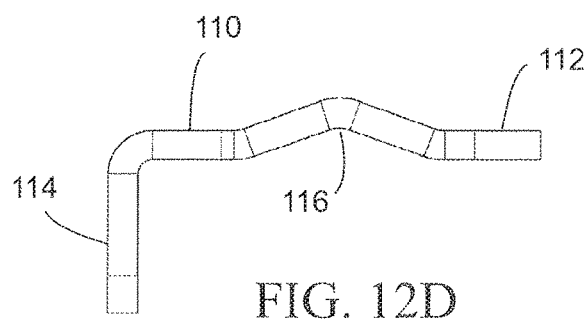
FIG. 12D is a right side elevation view of the scraper bracket of FIG. 12.
Figure 12B:
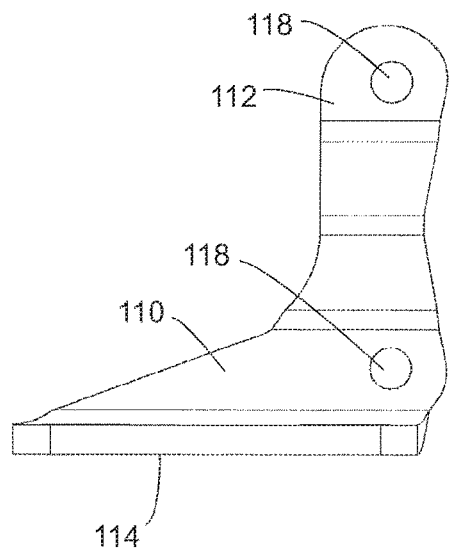
FIG. 12B is a bottom plan view of the scraper bracket of FIG. 12.

FIG. 5 is an exploded view of the scraper assembly 100 which comprises a bracket member 110, a scraper blade 120 and a U-bolt 130. As best viewed in FIG. 12, the bracket member 110 includes a leg 112 and a downturned flange 114. The leg 112 includes an arcuate bend 116 to mate with the curvature of the arm hub 35. The leg 112 includes holes 118 to receive the ends of the U-bolt 130 projecting above the arm hub 35 on each side. The bracket member 110 is secured by nuts 117 to the U-bolt 130 and the arm hub 35. The downturned flange 114 includes apertures 119 which align with mating apertures 122 in the scraper blade 120. The apertures 119 may be elongated for lateral adjustment for utilization on different gauge wheel arm designs from different manufacturers. The scraper blade 120 is secured to the downturned flange 114 with bolts (not sown) which extend through the mating apertures 119, 122 and are secured by nuts (not shown). The apertures 122 are elongated to permit adjustment of the scraper blade 120 relative to the surface of the gauge wheel members 36A, 36B to accommodate for tread wear on the gauge wheel members 36A, 36B or wear of the scraper blade 120.

The scraper blade 120 is a flat plate with a finger projection 124 extending downward below inner and outer scraper flanges 126, 128. The finger projection 124 has a width slightly less than the width of the gap 39 between the inner and outer wheel members 36A, 36B. The inner and outer scraper flanges 126, 128 have a width approximating the widths of the respective inner and outer gauge wheel members 36A, 36B and each has a lower end contour to mate with the contours in the circumferential periphery of the inner and outer gauge wheel members 36A, 36B.

FIGS. 6-9 show an alternative embodiment of a scraper assembly 100A for use with a gauge wheel arm 34 and arm hub 35 that has a slightly different configuration than that shown in FIGS. 2-5 resulting in a greater distance from hub 35 to the surface of the inner and outer wheels members 36A, 36B. To accommodate for this greater distance, the scraper assembly 100A includes a intermediate plate 150; otherwise the bracket member 110, scraper blade 120 and U-bolt 130 are the same as previously described in connection with the scraper assembly 100. In the scraper assembly embodiment 100A, intermediate plate 150 is attached to the downturned flange 114 by nut and bolt connectors (not shown) extending through a first set of apertures 152 in the intermediate plate 150. The scraper blade 120 is then secured to the intermediate plate 150 by nut and bolt connectors (not shown) through a second set of apertures 154 in the intermediate plate 150. In another embodiment, intermediate plate 150 can be used in place of scraper blade 120 by not including scraper blade 120. Note, while intermediate plate 150 is illustrated with apertures 152 and scraper blade 120 with apertures 122, apertures 152 and 122 are interchangeable. The apertures can be modified to adjust to different types of planter row unit configurations.

FIGS. 13-20 show a second alternative embodiment of a scraper assembly 100B. Referring to FIGS. 17-20, unlike the previous embodiments 100, 100A, the scraper assembly 100B has a different configuration for the left gauge wheel 32-L and the right gauge wheel 32-R, with the scraper assembly 100B for the left gauge wheel assembly 32-L designated by reference number 100B-L and the scraper assembly 100B for the right gauge wheel assembly 32-R designated by reference number 100B-R. It should be appreciated that both the left and right scraper assemblies 100B-L, 100B-R utilize the same universal bracket 110B (discussed later). The bracket 110B mounts to the arm hub 35 utilizing a U-bolt 130 that extends around the arm hub 35 in the same manner as in the previous described scraper assembly embodiments 100, 100A.

Figure 20:
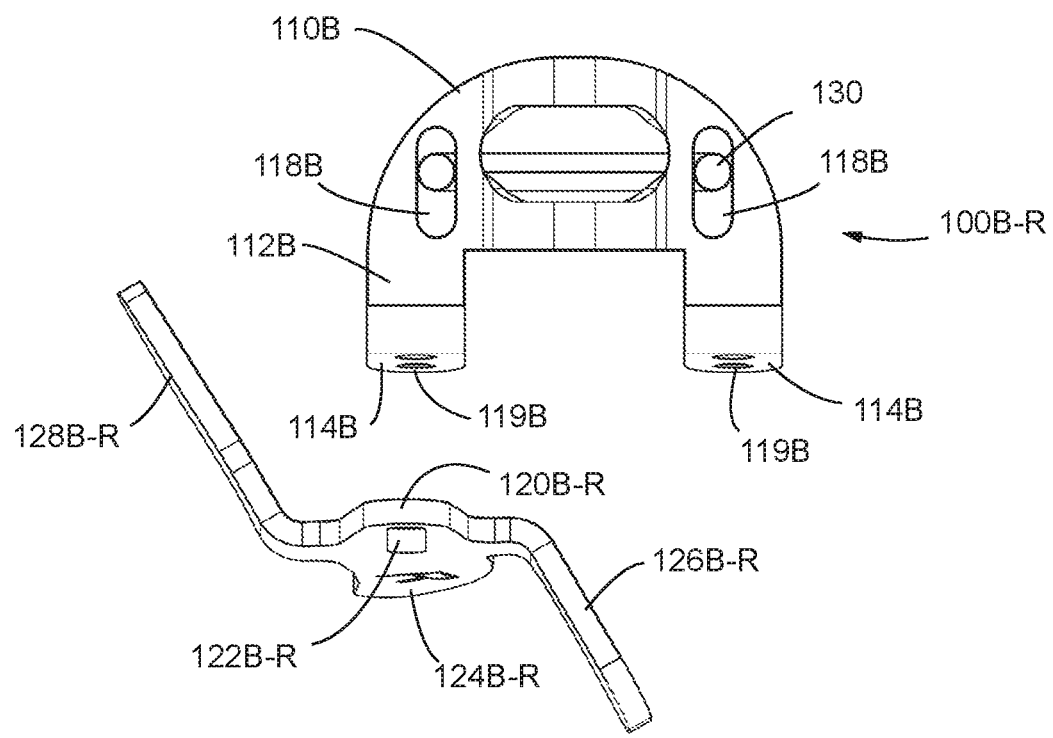
FIG. 20 is a top plan view of the scraper assembly of FIG. 18.
Figure 19:
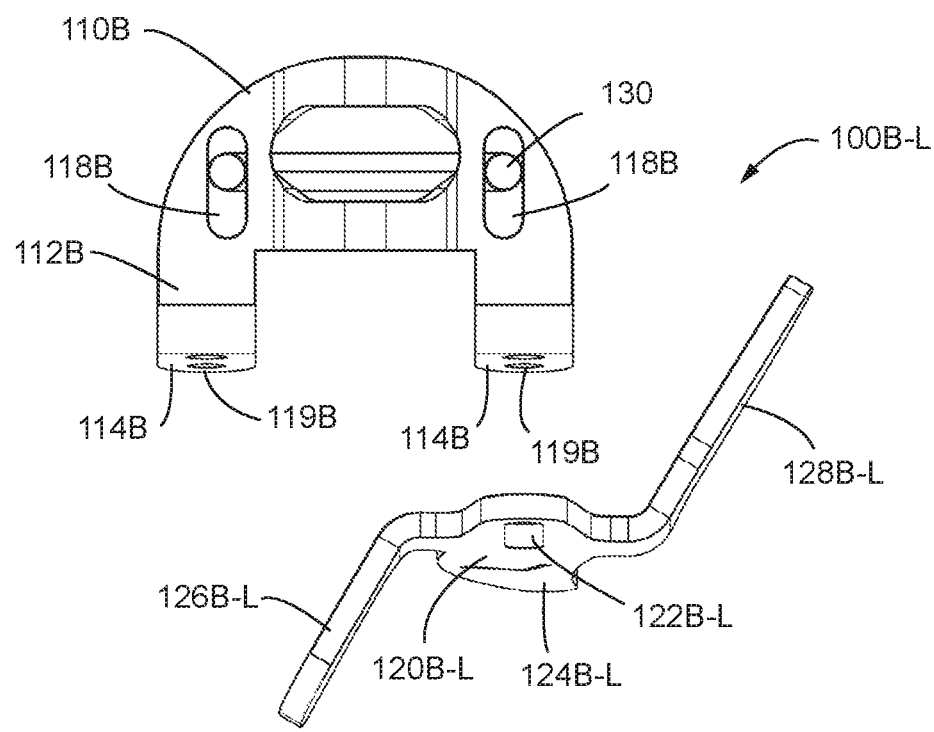
FIG. 19 is a top plan view of the scraper assembly of FIG. 17.

As best shown in the top plan views of FIGS. 19-20 of the respective left and right scraper assemblies 100B-L, 100B-R, the left scraper assembly 100B-L utilizes a left scraper blade 120B-L and the right scraper assembly 100B-R utilizes a right scraper blade 120B-R. The right scraper blade 120B-R is a mirror image of the left scraper blade 120B-L and each attaches to a different end of the downturned flange 114B of the universal bracket 110B as discussed later.

FIGS. 13-16 show only the left gauge wheel assembly 32-L and the left scraper assembly 100B-L. However, it should be appreciated that the right scraper assembly 100B-R will be mounted and arranged with respect to the right gauge wheel assembly 32-R in the same manner as the left side as described in more detail below.

Figure 13:
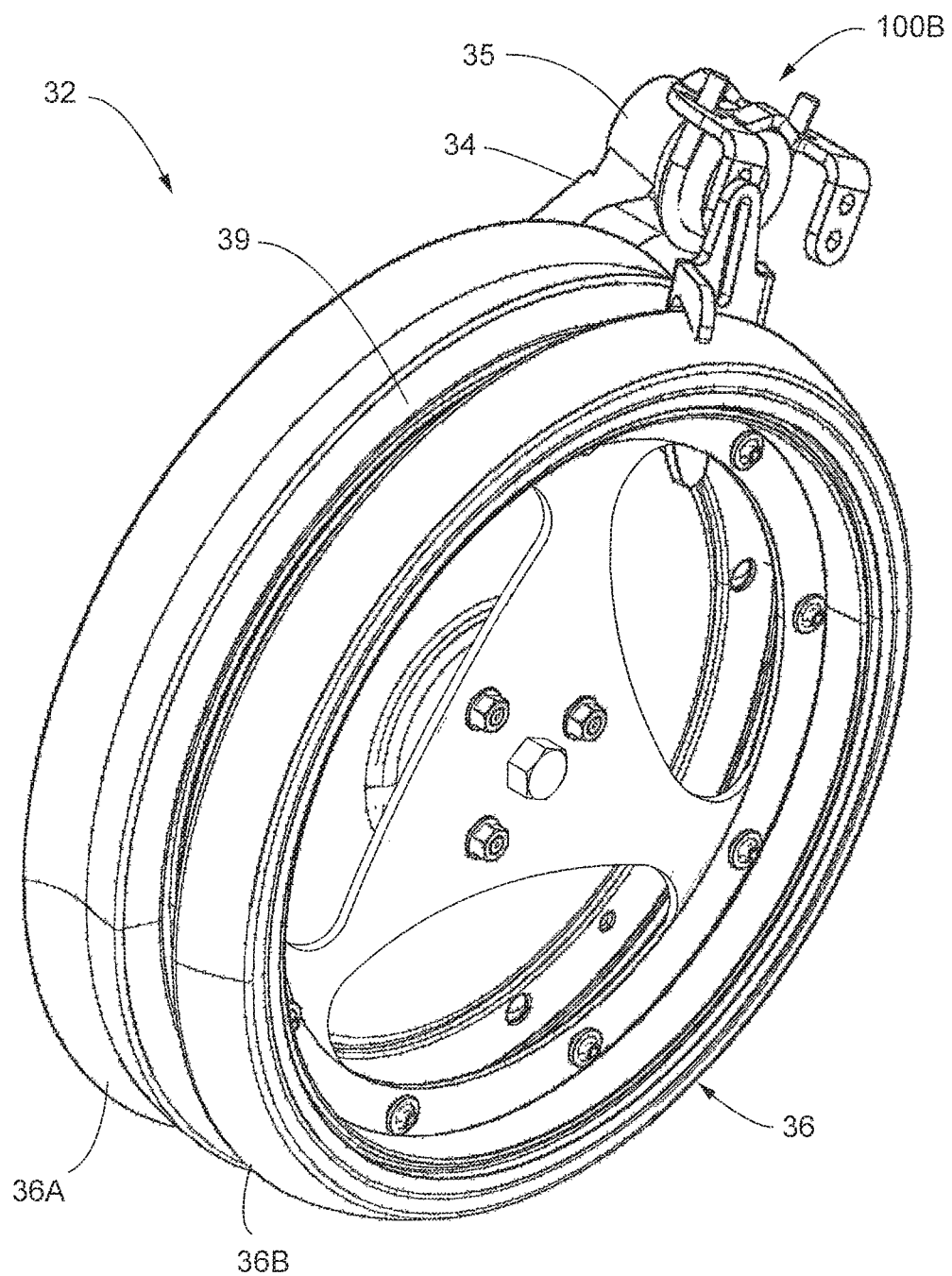
FIG. 13 is a front perspective view of the left split gauge wheel assembly shown in FIG. 1 with another embodiment of a scraper assembly.
Figure 14:
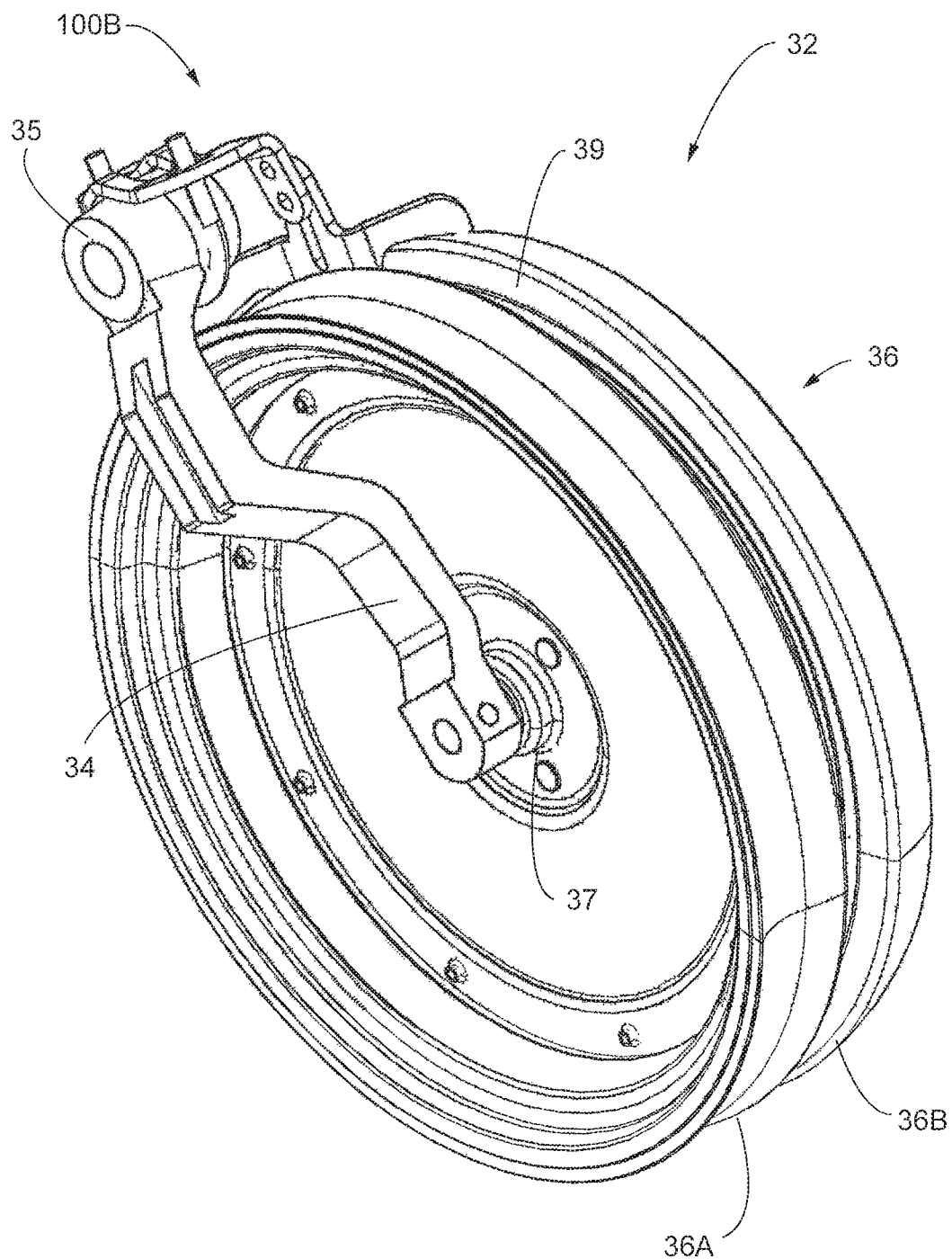
FIG. 14 is a perspective view of the left split gauge wheel assembly and scraper assembly of FIG. 13 viewed from the inner side of the left gauge wheel assembly showing the gauge wheel arm.

FIG. 13 is a forward perspective view of the left gauge wheel assembly 32-L removed from the row unit frame 16 for clarity and showing the left scraper assembly 100B-L secured to the arm hub 35. FIG. 14 shows the gauge wheel assembly of FIG. 13 rotated 180 degrees to show the gauge wheel arm 34 on the inside of the gauge wheel assembly 32-L. As previously described, the gauge wheel assemblies 32-L, 32-R each comprises a split gauge wheel 36 comprising an inner wheel member 36A and an outer wheel member 36B, which are spaced apart laterally resulting in a gap or space 39 between the inner and outer wheels 36A, 36B.

Figure 15:
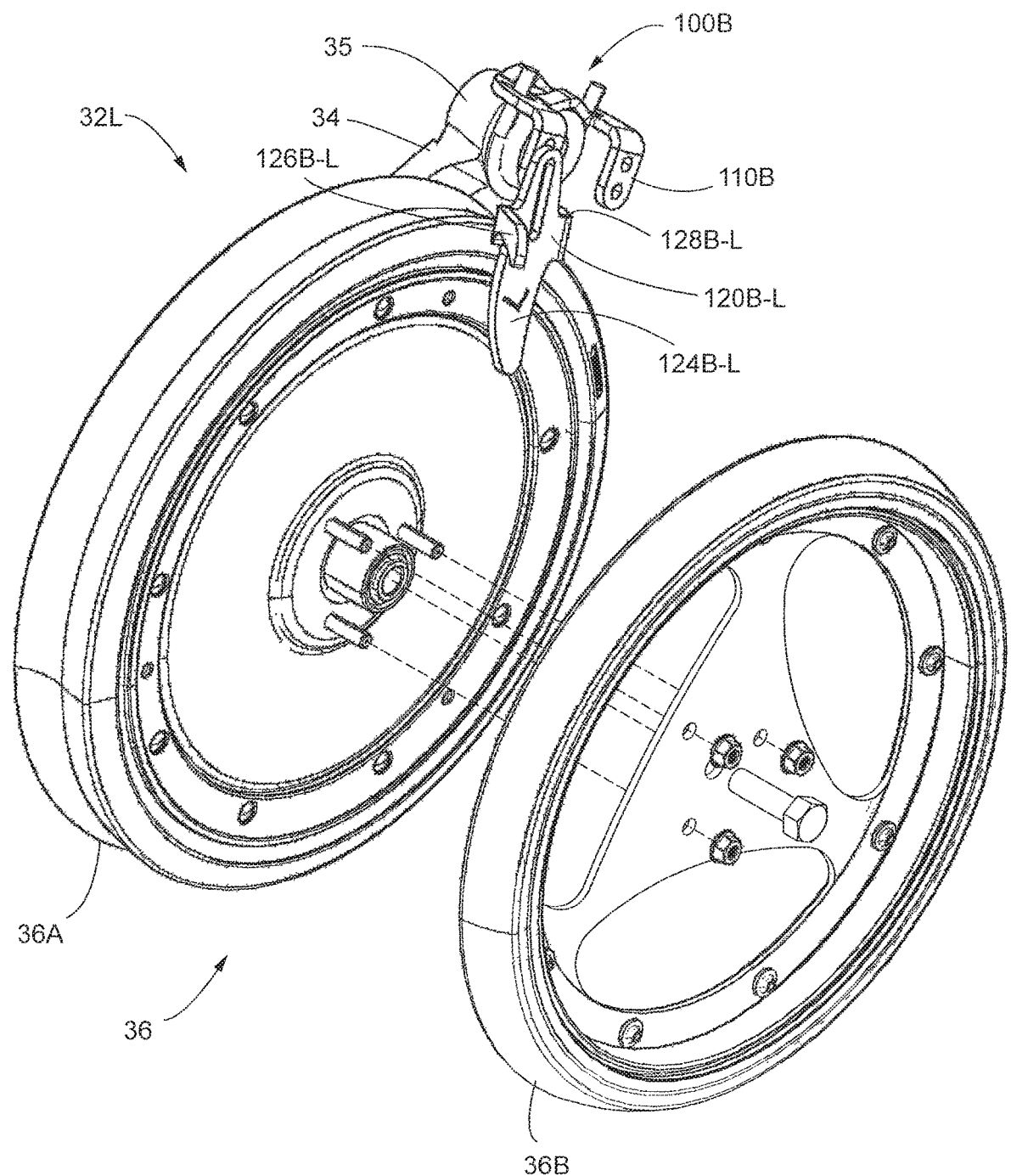
FIG. 15 the same perspective view as FIG. 13 with the left split gauge wheel assembly shown exploded.
Figure 16:
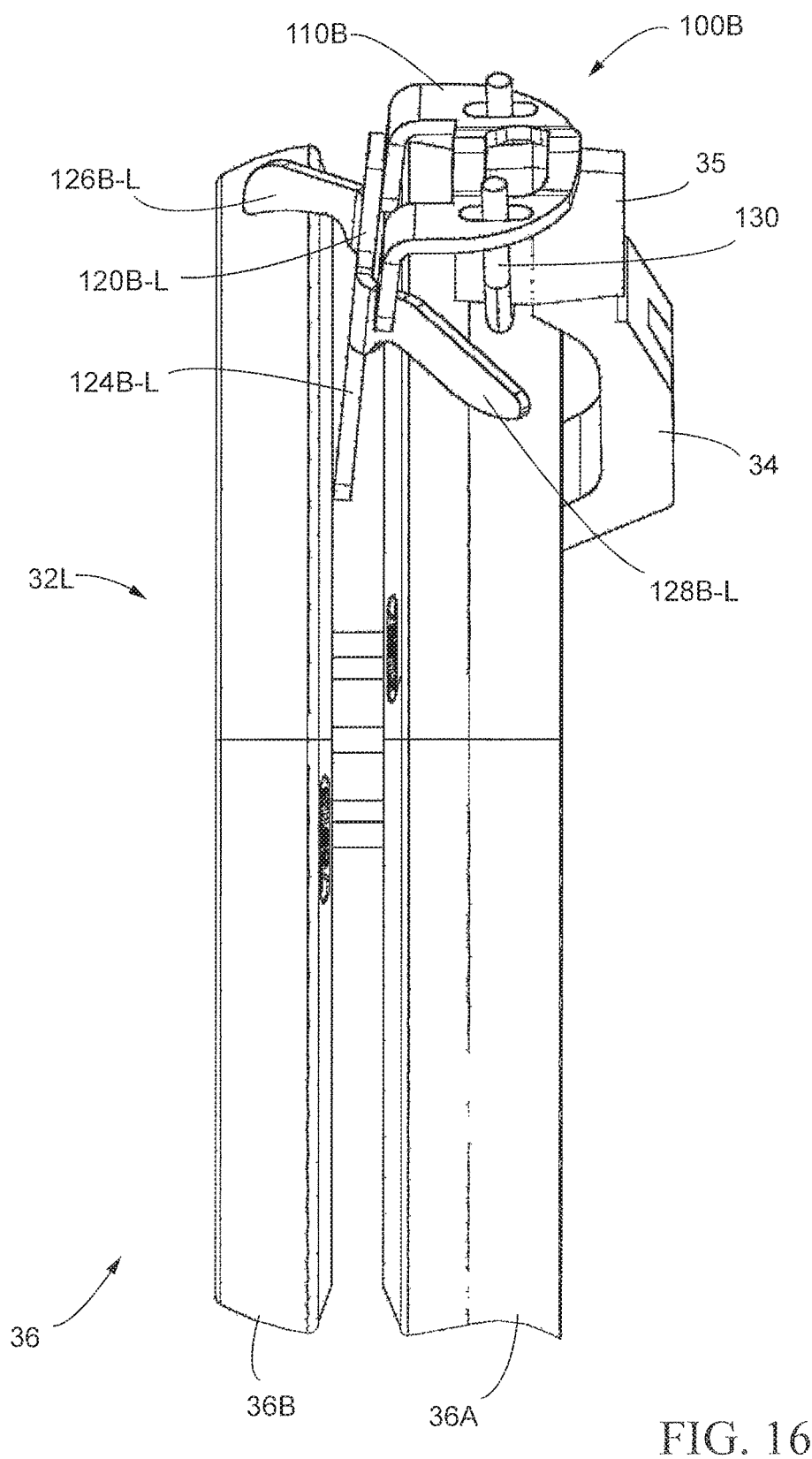
FIG. 16 is a rear elevation view of the left split gauge wheel assembly and scraper assembly of FIG. 13.

FIG. 15 shows the left gauge wheel assembly 32-L with the outer wheel member 36B shown exploded from the inner wheel member 36A to better illustrate how the left scraper blade 120B-L is positioned and mounted. FIG. 16 is a rear elevation view of the left gauge wheel assembly 32-L with the left scraper blade 120B-L positioned with respect to the inner and outer wheel members 36A, 36B to scrape soil buildup, mud, debris, plant matter or rocks from their outer surface and from between the inner and outer wheel members 36A, 36B as they rotate.

Referring to FIGS. 17-20, the bracket member 110B includes a leg 112B with a downturned flange 114B. The downturned flange 114B may have separate downturned ends as shown or the downturned flange 114B may be continuous across the width of the bracket member 110B (not shown). The leg 112B includes an arcuate bend 116B to mate with the curvature of the arm hub 35. The leg 112B includes holes 118B to receive the ends of the U-bolt 130 projecting above the arm hub 35 on each side (see FIGS. 13-16). The bracket member 110 is secured by nuts (not shown) to the U-bolt 130 and the arm hub 35. The downturned flange 114B includes apertures 119B which align with an elongated mating aperture 122B in the respective left and right scraper blades 120B-L, 120B-R. The left scraper blade 120B-L is secured by nut and bolt connectors (not shown) to the downturned flange 114B that is forward when the bracket 110B is mounted to the left gauge wheel assembly 32-L. Similarly, the right scraper blade 120B-R is secured by nut and bolt connectors (not shown) to the downturned flange 114B that is forward when the bracket 110B is mounted to the right gauge wheel assembly 32-R. The apertures 122B are elongated to permit adjustment of the scraper blades 120B-L, 120B-R relative to the surface of the gauge wheel members 36A, 36B to accommodate for different gauge wheel assemblies of different manufacturers, and to accommodate for tread wear on the gauge wheel members 36A, 36B or wear of the scraper blades 120B-L, 120B-R.

Figure 18:
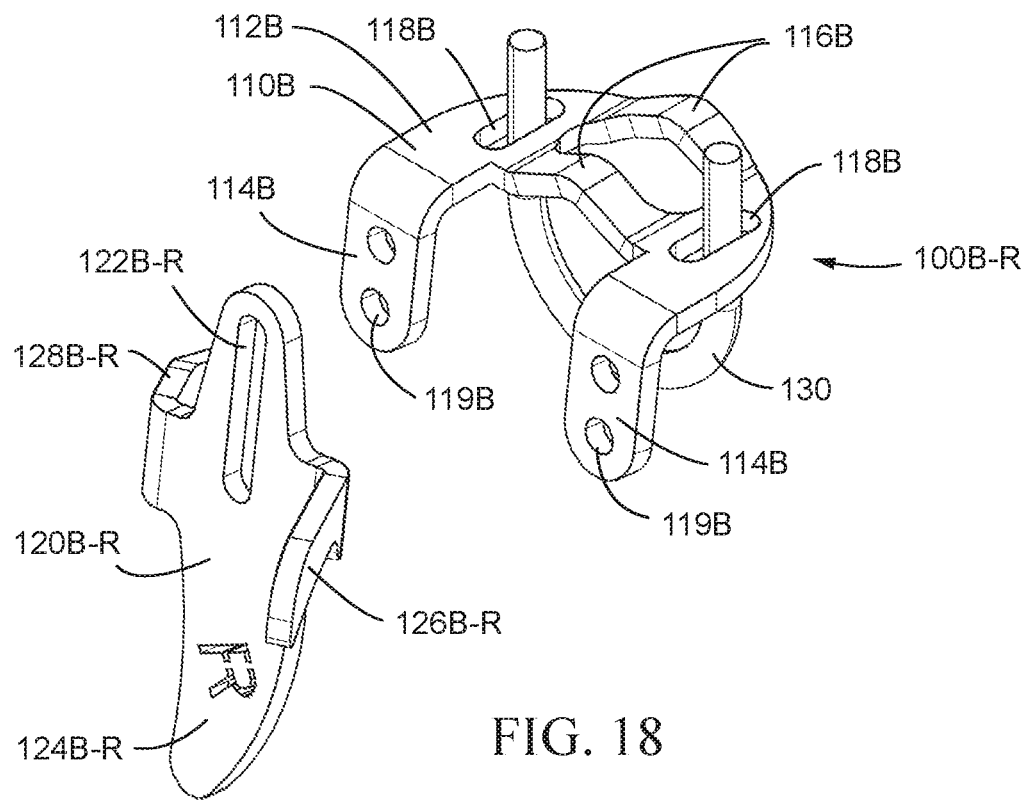
FIG. 18 is a perspective view of a right scraper assembly for the right gauge wheel shown exploded.
Figure 17:
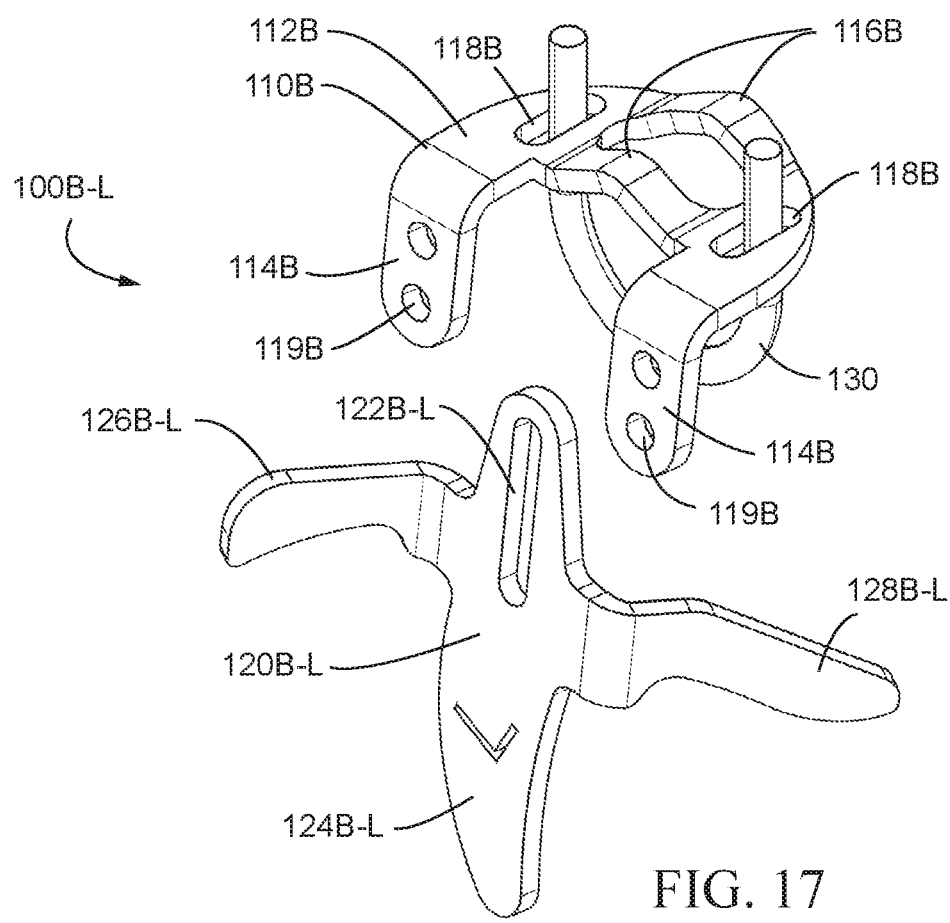
FIG. 17 is a perspective view of the left scraper assembly of FIG. 13 shown exploded.

The scraper blades 120B-L, 120B-R include a finger projection 124B extending downward below inner and outer scraper flanges 126B, 128B. The respective fingers projections 124B, and inner and outer flanges 126B, 126B for each of the left and right scraper blades 120B-L, 120B-R are identified in FIGS. 17-20 with the respective left and right designators "L" and "R". The inner and outer scraper flanges 126B, 128B are bent inward and outward with respect to the finger projection 124 as best shown in FIGS. 19-20. When mounted to the gauge wheel assembly 32 as shown in FIGS. 13-16, the finger projection 124B is positioned within the gap 39 between the inner and outer wheel members 36A, 36B and is oriented at a slight angle or cant between the inner and outer wheel members 36A, 36B. The finger projection 124B may include a slight curvature with an arcuate convex edge and an arcuate concave edge as shown in FIGS. 17 and 18 to accommodate for curvatures in the profiles of the inner and outer wheel members 36A, 36B within the gap 39. The inner and outer scraper flanges 126B, 128B have a width approximating the widths of the respective inner and outer gauge wheel members 36A, 36B and each has a lower end contour to mate with the contours in the circumferential periphery of the inner and outer gauge wheel members 36A, 36B.

Various modifications to the embodiments and the general principles and features of the apparatus, systems and methods described herein will be readily apparent to those of skill in the art. Thus, the appended claims should not be limited to the embodiments of the apparatus, systems and methods described herein and illustrated in the accompanying drawing figures, but should be accorded the widest scope consistent with the foregoing disclosure.

The invention claimed is:

1. A split gauge wheel assembly for of a planter row unit, comprising:
    (a) a gauge wheel arm having an arm hub at a first end and having a rotatable wheel hub at a second end, the arm hub adapted to pivotally mount to a frame member of the planter row unit;
    (b) a split gauge wheel secured to the rotatable wheel hub, the split gauge wheel including:
        (i) an inner wheel member disposed adjacent to the rotatable wheel hub, the inner wheel member having a width and a circumferential periphery; and
        (ii) an outer wheel member having a width and a circumferential periphery, the outer wheel member spaced laterally outward from the inner wheel member, thereby defining a gap between the inner wheel member width and the outer wheel member width; and
    (c) a scraper assembly, including:
        (i) a bracket member secured to the arm hub;
        (ii) a scraper blade movable relative to the bracket member, the scraper blade including:
            (A) a finger projection extending downwardly into the gap between the inner wheel member and the outer wheel member;
            (B) an inner scraper flange extending laterally inward from the finger projection, the inner scraper flange having a lower end disposed in proximity to the circumferential periphery of the inner wheel member;
            (C) an outer scraper flange extending laterally outward from the finger projection, the outer scraper flange having a lower end disposed in proximity to the circumferential periphery of the outer wheel member;
        whereby the inner scraper flange removes soil buildup on the circumferential periphery of the inner wheel member as the split gauge wheel rotates during field operations;
        whereby the outer scraper flange removes soil buildup on the circumferential periphery of the outer wheel member as the split gauge wheel rotates during field operations; and
        whereby the finger projection removes soil buildup in the gap between the inner wheel member and the outer wheel member as the split gauge wheel rotates during field operations.

2. The split gauge wheel assembly of claim 1, wherein the lower end of the inner scraper flange has a contour to mate with a contour in the circumferential periphery of the inner wheel member.

3. The split gauge wheel assembly of claim 2, wherein the lower end of the outer scraper flange has a contour to mate with a contour in the circumferential periphery of the outer wheel member.

4. The split gauge wheel assembly of claim 1, wherein the lower end of the outer scraper flange has a contour to mate with a contour in the circumferential periphery of the outer wheel member.

5. The split gauge wheel assembly of claim 1, wherein the inner scraper flange has a width approximating the width of the inner wheel member.

6. The split gauge wheel assembly of claim 5, wherein the outer scraper flange has a width approximating the width of the outer wheel member.

7. The split gauge wheel assembly of claim 1, wherein the outer scraper flange has a width approximating the width of the outer wheel member.

8. The split gauge wheel assembly of claim 1, wherein the inner wheel member includes a solid wheel disc extending between the wheel hub and a wheel rim of the inner wheel.

9. The split gauge wheel assembly of claim 1, wherein the outer wheel member includes a spoked wheel disc defining openings between the rotatable wheel hub and a wheel rim of the outer wheel member.

10. The split gauge wheel assembly of claim 1, wherein the bracket member is secured to the arm hub by a U-bolt received around the arm hub, wherein threaded ends of the U-bolt extend through apertures in the bracket member, the U-bolt and bracket member being rigidly secured to the arm hub by threaded nuts threadably receiving the threaded ends of the U-bolt.

11. The split gauge wheel assembly of claim 1, further including an intermediate plate disposed between the scraper blade and the bracket member.

12. The split gauge wheel assembly of claim 1, wherein the scraper blade is laterally adjustable relative to the bracket member.

13. The split gauge wheel assembly of claim 1, wherein the scraper blade is laterally adjustable relative to the arm hub.

14. The split gauge wheel assembly of claim 1, wherein the finger projection is disposed at an angle relative to vertical.

15. A scraper assembly adapted for a split gauge wheel assembly of a planter row unit, wherein the split gauge wheel assembly includes a gauge wheel arm having an arm hub at a first end and having a rotatable wheel hub at a second end, the arm hub adapted to pivotally mount to a frame member of the planter row unit, the rotatable wheel hub supporting a split gauge wheel, the split gauge wheel including an inner wheel member and an outer wheel member, the inner wheel member disposed adjacent to the rotatable wheel hub, the outer wheel member spaced laterally outward from the inner wheel member, thereby defining a gap between the inner wheel member and the outer wheel member, the scraper assembly comprising:
  a bracket member adapted to be secured to the arm hub;
  a scraper blade movable relative to the bracket member, the scraper blade including:
    a finger projection configured to extend downwardly into the gap between the inner wheel member and the outer wheel member;
    an inner scraper flange extending laterally inward from the finger projection, the inner scraper flange having a lower end configured to be disposed in proximity to a circumferential periphery of the inner wheel member;
    an outer scraper flange extending laterally outward from the finger projection, the outer scraper flange having a lower end configured to be disposed in proximity to a circumferential periphery of the outer wheel member;
  whereby when in use, as the split gauge wheel rotates, the inner scraper flange removes soil buildup on the circumferential periphery of the inner wheel member and the outer scraper flange removes soil buildup on the circumferential periphery of the outer wheel member, and the finger projection removes soil buildup in the gap between the inner wheel member and the outer wheel member.

16. The scraper assembly of claim 15, wherein the lower end of the inner scraper flange has a contour to mate with a contour in a circumferential periphery of the inner wheel member.

17. The scraper assembly of claim 16, wherein the lower end of the outer scraper flange has a contour to mate with a contour in a circumferential periphery of the outer wheel member.

18. The scraper assembly of claim 15, wherein the lower end of the outer scraper flange has a contour to mate with a contour in a circumferential periphery of the outer wheel member.

19. The scraper assembly of claim 15, wherein the inner scraper flange has a width approximating a width of the inner wheel member.

20. The scraper assembly of claim 19, wherein the outer scraper flange has a width approximating a width of the outer wheel member.

21. The scraper assembly of claim 15, wherein the outer scraper flange has a width approximating a width of the outer wheel member.

22. The scraper assembly of claim 15, further including an intermediate plate disposed between the scraper blade and the bracket member.

23. The scraper assembly of claim 15, wherein the scraper blade is laterally adjustable relative to the bracket member.

24. The scraper assembly of claim 15, wherein the scraper blade is laterally adjustable relative to the arm hub.

25. The scraper assembly of claim 15, wherein the finger projection is disposed at an angle relative to vertical.

* * * * *